United States Patent
Beinborn et al.

(10) Patent No.: US 10,975,786 B2
(45) Date of Patent: Apr. 13, 2021

(54) CYLINDER DEACTIVATION AND VARIABLE GEOMETRY TURBOCHARGER CONTROL

(71) Applicant: Cummins Inc., Columbus, IN (US)

(72) Inventors: Aaron William Beinborn, Columbus, IN (US); Adrian P. Dale, Columbus, IN (US); Lyle E. Kocher, Whiteland, IN (US); J. Steven Kolhouse, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/564,308

(22) Filed: Sep. 9, 2019

(65) Prior Publication Data
US 2020/0149487 A1 May 14, 2020

Related U.S. Application Data

(60) Provisional application No. 62/760,556, filed on Nov. 13, 2018.

(51) Int. Cl.
*F02D 41/00* (2006.01)
*F02B 37/24* (2006.01)

(52) U.S. Cl.
CPC .......... *F02D 41/0087* (2013.01); *F02B 37/24* (2013.01); *F02D 41/0007* (2013.01); *F02D 2041/0012* (2013.01)

(58) Field of Classification Search
CPC ............. F02D 41/0087; F02D 41/0007; F02D 2041/0012; F02D 13/06; F02B 37/24
See application file for complete search history.

(56) References Cited

U.S. PATENT DOCUMENTS

| | | | |
|---|---|---|---|
| 6,692,406 B2* | 2/2004 | Beaty | B60W 10/06 477/109 |
| 7,380,447 B2 | 6/2008 | Rollinger et al. | |
| 8,640,679 B2* | 2/2014 | Wang | F02D 41/0007 123/568.21 |
| 9,051,871 B1 | 6/2015 | Wu et al. | |
| 9,228,536 B2 | 1/2016 | zur Loye et al. | |
| 9,399,969 B2 | 7/2016 | Boyer et al. | |
| 9,587,589 B2 | 3/2017 | Kemmerling et al. | |
| 9,771,883 B1* | 9/2017 | Haskara | F02D 41/1406 |
| 9,915,194 B2 | 3/2018 | Boyer et al. | |
| 2007/0074513 A1 | 4/2007 | Lamb et al. | |
| 2010/0250103 A1* | 9/2010 | Shimo | F02M 26/05 701/108 |
| 2011/0276251 A1* | 11/2011 | Kang | F02D 41/1497 701/103 |
| 2017/0159581 A1 | 6/2017 | McCarthy, Jr. et al. | |
| 2018/0100459 A1 | 4/2018 | Dickson et al. | |
| 2018/0135541 A1* | 5/2018 | Hsieh | F02B 37/24 |
| 2019/0085758 A1* | 3/2019 | Kurtz | F02D 41/0005 |
| 2019/0085759 A1* | 3/2019 | Kurtz | F01B 7/14 |

* cited by examiner

*Primary Examiner* — Joseph J Dallo
(74) *Attorney, Agent, or Firm* — Taft Stettinius & Hollister LLP

(57) ABSTRACT

Systems, apparatus, and methods are disclosed that include an internal combustion engine having a plurality of cylinders operable to be deactivated while controlling a variable geometry turbocharger in response to the reduced number of active cylinders.

20 Claims, 4 Drawing Sheets

CYLINDER DEACTIVATION AND VARIABLE GEOMETRY TURBOCHARGER CONTROL

CROSS-REFERENCE TO RELATED APPLICATION

The present application claims the benefit of the filing date of U.S. Provisional App. Ser. No. 62/760,556 filed on Nov. 13, 2018, which is incorporated herein by reference.

FIELD OF THE INVENTION

This invention relates to an internal combustion engine including multiple cylinders, and more particularly to controlling cylinder deactivation of one or more cylinders and variable geometry turbocharger (VGT) operation.

BACKGROUND

The cylinders in an internal combustion engine can be deactivated in order to reduce fuel consumption. This may be accomplished by cutting off the supply of fuel to selected cylinders, particularly to save fuel under light engine load conditions. Cylinder deactivation can also include disabling or maintaining the intake and/or exhaust valves of the cylinder(s) in a closed condition. Cylinder deactivation can therefore reduce mass airflow, which reduces engine efficiency and decreases the quality of emissions.

Prior art solutions to address engine efficiency and emissions quality issues attempt to control airflow through a turbine by using adjustable vanes in turbocharger. However, these vanes may become stuck during normal operation do to, for example, deposits. Therefore, further improvements in cylinder deactivation operations are needed.

SUMMARY

Embodiments include unique systems and methods that include a multi-cylinder internal combustion engine configured to control deactivation of at least one cylinder of the multiple cylinders. In one embodiment, the engine includes a VGT and a fuel supply system for supplying fuel to each cylinder. A controller is configured to receive one or more inputs associated with one or more operating conditions to control deactivation of one or more of the cylinder and a geometry of the VGT in response to a cylinder deactivation event in which the one or more cylinders are deactivated.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1A:
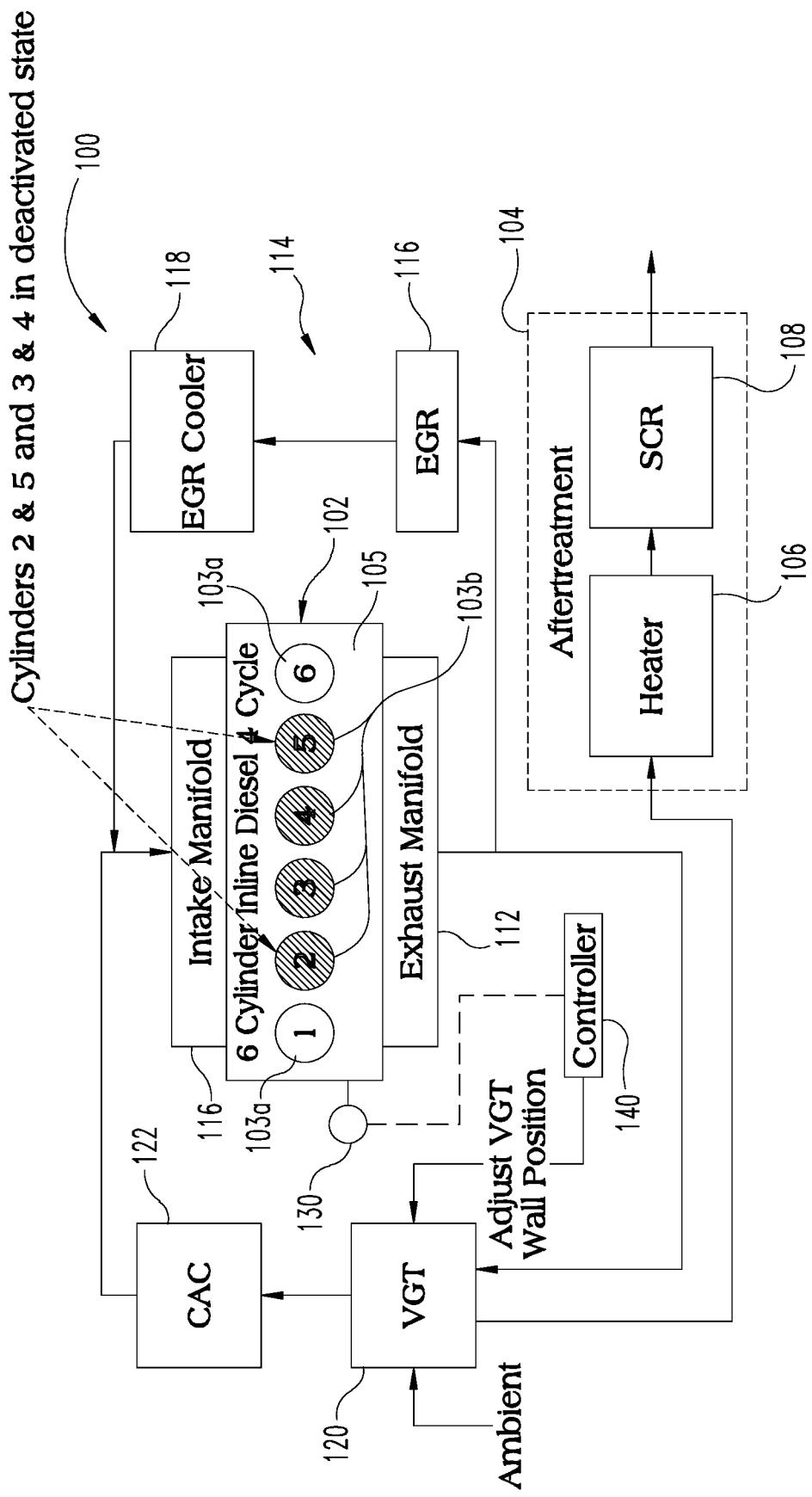
FIGS. 1A and 1B are schematic depictions of alternative embodiments of a vehicle system including a powertrain.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1A, a vehicle system 100 includes an engine 102 fluidly coupled to an aftertreatment system 104 as shown in FIG. 1. The vehicle system 100 further includes a transmission (not shown) coupled to the engine 102, which may be a part of a powertrain for propelling a vehicle driven by engine 102 via wheels. The engine 102 may be any type of internal combustion engine, including at least a diesel, gasoline, or natural gas engine, and/or combinations thereof. The aftertreatment system 104 may include any type of aftertreatment components known in the art, such as a heater 106 and selective catalytic reduction (SCR) catalyst 108. Aftertreatment components may additionally or alternatively include catalytic and/or filtration components. Example aftertreatment components may include, without limitation, oxidation catalysts (e.g., a diesel oxidation catalyst ("DOC"), $NO_x$ treatment components (e.g., three-way catalyst, lean $NO_x$ catalyst, SCR catalyst, etc.), a filtration component (either catalyzed or uncatalyzed, e.g., a diesel particulate filter ("DPF"), and a cleanup catalyst (e.g., an ammonia oxidation catalyst).

In certain embodiments, the engine 102 includes a lean combustion engine such as a lean burn gasoline engine, or a diesel cycle engine. In certain embodiments, the engine 102 may be any engine type producing emissions that may include an exhaust gas recirculation (EGR) system, for example to reduce $NO_x$ emissions from the engine 102. In the illustrated embodiment of FIG. 1A, the vehicle system 100 includes an engine 102 having an in-line 6-cylinder arrangement for illustration purposes. However, V-shaped arrangements and other any number of cylinders with V-shaped and with in-line arrangements are also contemplated.

Figure 1B:
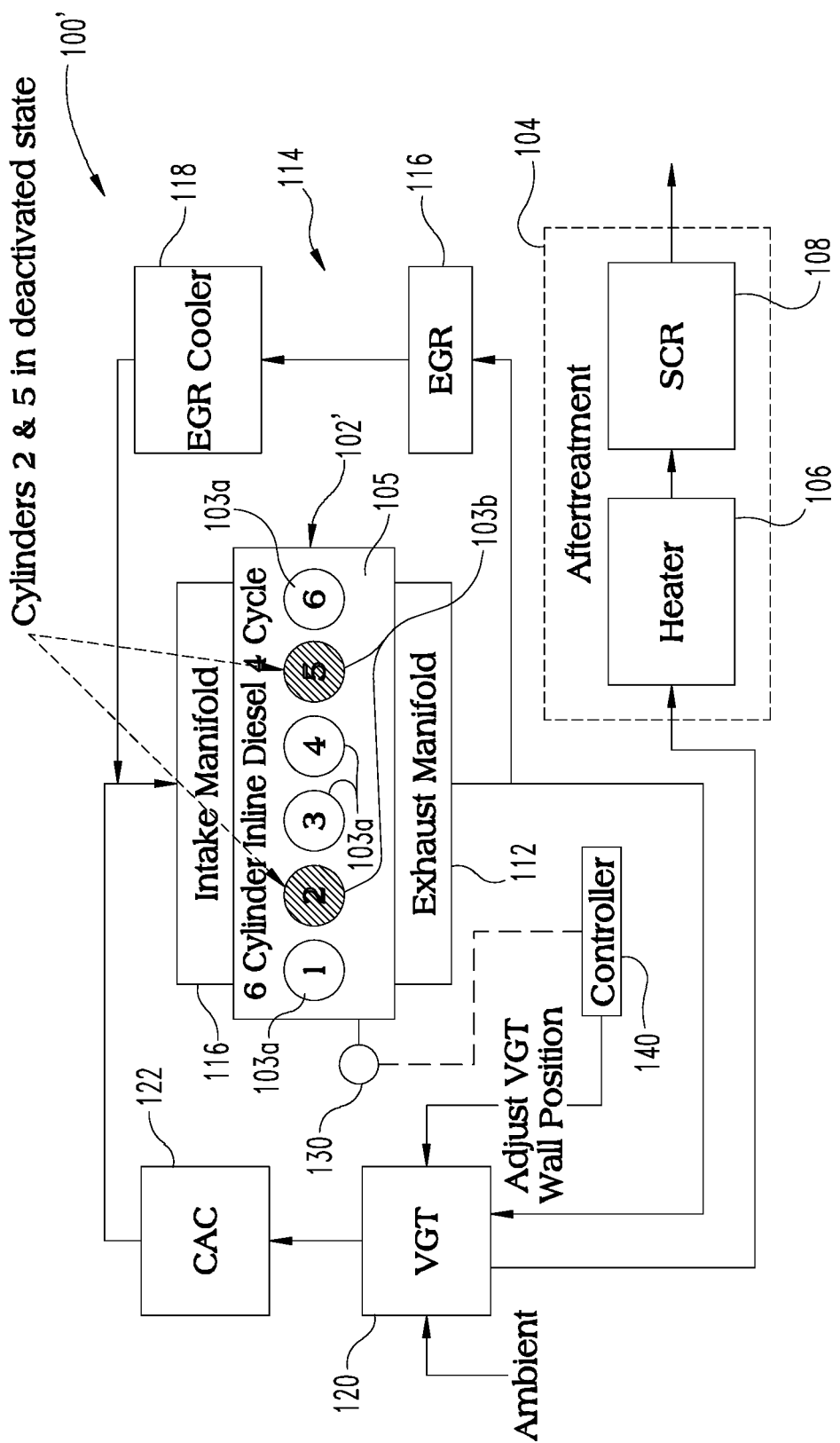

The engine 102 includes a number of cylinders 103a, 103b (collectively referred to as cylinders 103.) The engine 102 includes nominal cylinders 103a which are operated with a nominal valve lift profile under both nominal operating events and cylinder deactivation events, and one or more deactivation cylinders 103b which are operated with a deactivated lift profile in response to a cylinder deactivation event being present. The deactivation cylinders 103b can be operated with the nominal valve lift profile when cylinder deactivation event conditions are not present. In the illustrated embodiment of FIG. 1A, two cylinder pairs (first cylinder pair 2, 5 and second cylinder pair 3, 4) comprising four cylinders of engine 102 are deactivation cylinders 103b and cylinder pair 1, 6 are nominal cylinders 103a. In FIG. 1B showing another embodiment of vehicle system 100', engine 102' includes one cylinder pair 2, 5 that are deactivation cylinders 103b and the remaining cylinder numbers 1, 3, 4, 6 are nominal cylinders 103a. Other embodiments contemplated other numbers of nominal and deactivation cylinders, including one or more deactivation cylinders. For example, in one embodiment, cylinders 1-3 are deactivated and 4-6 are active, or cylinders 1-3 are active and cylinders 4-6 are deactivated, so that engine 102 runs on just either the front cylinders or the rear cylinders. In addition, the cylinders identified as nominal cylinders 103a and deactivation cylinders 103b in FIGS. 1A and 1B can be in any order. Furthermore, any known type of mechanism for deactivating one or more cylinders 103b is contemplated.

A typical multi-cylinder engine 102 has an engine block 105 with multiple cylinders 103 each with a combustion chamber housing a piston that is operably attached to a crankshaft (not shown). There is also at least one intake valve and at least one exhaust valve that allow passage of air into and out of each cylinder 103 from an intake manifold 110 to an exhaust manifold 112. The typical engine 102 operates on a four-stroke cycle that sequentially includes an air intake stroke, a compression stroke, a power stroke, and an exhaust stroke for the piston of each cylinder. As used herein, one cycle of the cylinder or engine occurs at the completion of these four strokes.

When cylinders are deactivated, the intake and/or exhaust valves of the deactivated cylinder(s) 103b remain in a completely closed condition during a cylinder deactivation event. In addition, fuel delivery to the deactivated cylinder(s) 103b is cut off or stopped. The active cylinders 103a can then be operated with a greater amount of air and fuel to meet the engine power demands. The active cylinders 103a thus operate with a greater air flow, reducing pumping losses, and improved fuel efficiency. However, engine and emissions efficiencies are reduced due to lower mass air flow, lower air-fuel ratios and reduced turbine temperatures.

The present vehicle system 100 includes a VGT 120 that is connected to exhaust manifold 112. A VGT 120 may include movable vanes, but the VGT 120 can also be a variable nozzle turbine having a movable wall instead of movable vanes. Aftertreatment system 104 is also connected to exhaust manifold 112. VGT 120 includes a turbine that receives exhaust flow and a compressor that receives ambient air flow. The compressor compresses the ambient air and provides it to a charge air cooler (CAC) 122 which is connected to intake manifold 110. The exhaust manifold 112 is also connect to an exhaust gas recirculation (EGR) system 114 that includes an EGR valve 116 and an EGR cooler 118. EGR system 114 is operable to provide an EGR flow that combines with an intake flow at a position upstream of intake manifold 110. Intake manifold 110 provides a charge flow including the intake flow and, if provided, the EGR flow to cylinders 103. The intake passage may also include an intake throttle (not shown) to regulate the charge flow to cylinders 103.

Vehicle system 100 further includes a fuel system (not shown) that is operable to provide fuel from a fuel storage source, such as a fuel tank, to cylinders 103. A plurality of fuel injectors can be provided, at least one per cylinder, to inject fuel into each cylinder in response to a fueling command from controller 140. In one embodiment, the fuel injectors are direct injectors. It should be understood that any suitable fuel system is contemplated.

A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder 103. In certain embodiments, the direct injector may be structured to inject fuel into a combustion pre-chamber. Each cylinder 103 may include one or more direct injectors. The direct injectors may be the primary or the only fueling device for the cylinders 103, or alternatively the direct injectors may be an auxiliary or secondary fueling device for the cylinders 103. In certain embodiments, the direct injectors are capable of providing the entire designed fueling amount for the cylinders 103 at any operating condition. Alternatively, the direct injectors may be only partially capable, for example the direct injectors may be capable of providing a designated amount of fuel for a specific purpose.

In still other embodiments, cylinders 103 include a port injector (not shown) in addition to or alternatively to direct injectors. In these embodiments, the intake manifold 110 may be divided, or the port fuel injectors may be positioned such that no other cylinder 103 in the vehicle system 100 is downstream of the port fuel injector, i.e. only the target cylinder is downstream of the respective port fuel injector.

The fuel supply to the combustion chamber of each cylinder is controlled by a fuel control module that is a separate controller or a part of controller 140. The fuel control module operates the direct injectors according to a fuel command produced by controller 140 in response to engine operating conditions. The controller 140 is connected to a plurality of sensors shown schematically as sensors 130. The sensors 130 may include, but are not limited to, engine and/or vehicle sensors which monitor or measure engine and/or vehicle conditions such as vehicle speed, vehicle acceleration, engine position, engine speed, manifold static pressure, mass air flow into the manifold, engine temperature, air temperature, cam shaft position (inlet and exhaust), inlet manifold tuning valves, barometric pressure, EGR amount, VGT position, torque demand, gear position, etc. In addition, controller 140 may be configured to receive from, for example, one or more sensors 130 or from a memory of controller 140, environmental conditions and/or look ahead data, such as a proximity or position of other vehicles, a spacing or distance to one or more other vehicles, a speed of one or more other vehicles, route conditions, upcoming grade conditions, GPS data, mapping data, inputs from one or more other vehicles or a forward looking radar system, and/or one or more models of vehicle system 100 including estimated mass, aerodynamic drag, and other conditions associated with vehicle.

In certain embodiments, the vehicle system 100 includes a controller 140 structured to perform certain operations to control operations of engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown). The controller 140 is in communication with any sensor or actuator throughout the vehicle system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Certain systems are described following, and include examples of controller operations in various contexts of the present disclosure. In certain embodiments, the controller 140 interprets a cylinder deactivation event in response to one or more vehicle operating and/or route conditions, and in response to entering the cylinder deactivation event the controller 140 provides a cylinder deactivation command that cuts fueling to one or more of deactivation cylinders 103b, closes the intake and/or exhaust valves of the deactivated cylinders, and then adjusts a geometry of an opening of VGT 120 by, for example, positioning a wall into an exhaust flow path through VGT 120. In certain other embodiments, the controller 140 interprets a cylinder re-activation event in response to one or more vehicle operating and/or route conditions, and in response to exiting the cylinder deactivation event the controller 140 provides a cylinder activation command that adjusts the geometry of an opening of VGT 120 by, for example, moving a wall out of the exhaust flow path of VGT 120, resumes the opening/closing of the intake and/or exhaust valves of the re-activated cylinders, and then provides fueling to the re-activated cylinders.

The operation of the engine 102 is controlled by the controller 140 in response to vehicle operating conditions sensed by the sensors represented by sensor(s) 130. Controller 140 is connected to the fuel injectors, either indirectly through a fuel control module, or directly, to control the injector operation. The controller 140 can determine the injection timing and the injection period or pulse width. Under normal or nominal engine operating conditions, fuel is provided to all cylinders 103. Under a cylinder deactivation event, fuel is only provided to cylinders 103a and cut off from deactivation cylinders 103b.

The fuel injectors may inject the fuel supply directly into each respective cylinder 103 or may supply fuel to the inlet valve ports, the injection timing being controlled the controller 140. During a cylinder deactivation event the supply of fuel to the deactivation cylinders 103b is cut off by individually disabling the respective fuel injectors with the disablement being controlled by the controller 140 with a fueling command which disables the fuel injection to one or more of the deactivation cylinders 103b while the nominal cylinders 103a fire normally, or are compensated with additional fuel and air flow to meet power demands.

Figure 2:
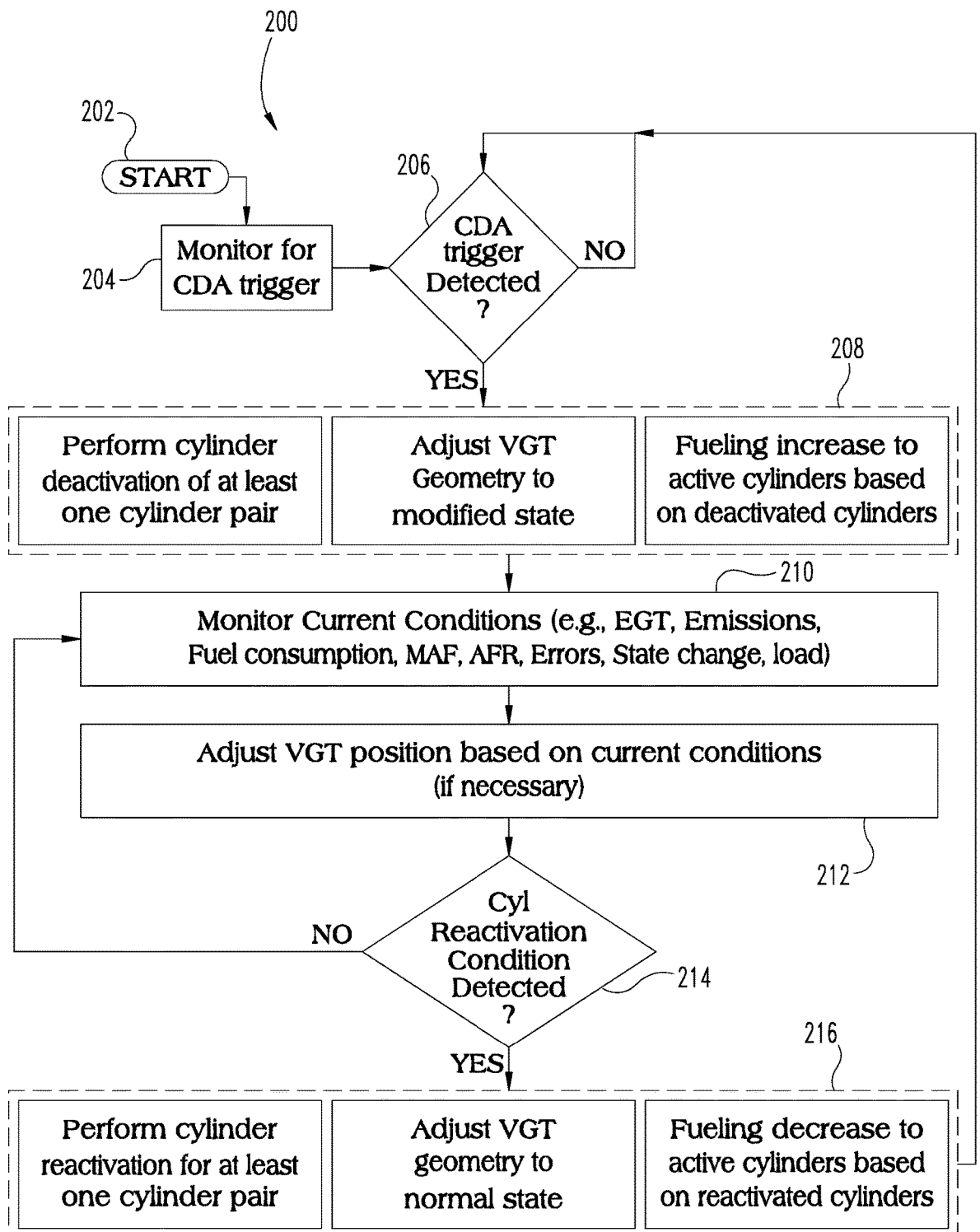
FIG. 2 is a flow diagram of a procedure for cylinder deactivation of the vehicle system of FIG. 1.

Referring now to FIG. 2, there is shown a procedure 200 for operating vehicle system 100. Procedure 200 starts at 202 with operation of the vehicle, and continues at operation 204 to monitor for a cylinder deactivation (CDA) event trigger. At conditional 206, procedure 200 determines if the CDA event trigger is detected. The determination that conditions trigger entry of a cylinder deactivation event includes determining or interpreting one or more vehicle operating conditions understood in the art indicating that cylinder deactivation produces favorable operating conditions, such as at low engine load conditions where the remaining non-deactivated cylinders 103a can satisfy the engine load requirements and fuel efficiency can be achieved by cutting fueling to one or more of the deactivation cylinders 103b. Examples for triggering a CDA event include determining engine load conditions below a threshold (e.g. accelerator pedal position), extended idle time, detected driving conditions or low load need (e.g. moving downhill or uphill, stop and go traffic), E-horizon or look-ahead data, learned behavior based on historical data, known route data, terrain information, current or changing transmission state, and currently cylinder fueling state. However, other conditions in which the cylinder deactivation event is indicated are also contemplated.

Figure 3A:
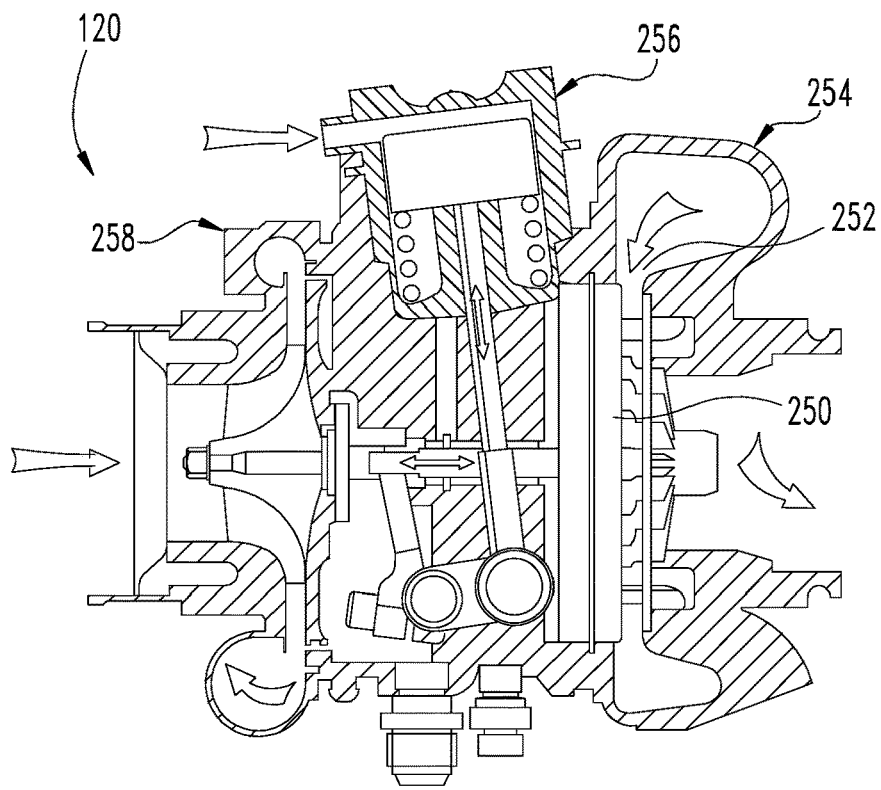
FIGS. 3A and 3B are schematic cross-sections of one embodiment of a VGT with a mechanism for controlling a geometry of the VGT.
Figure 3B:
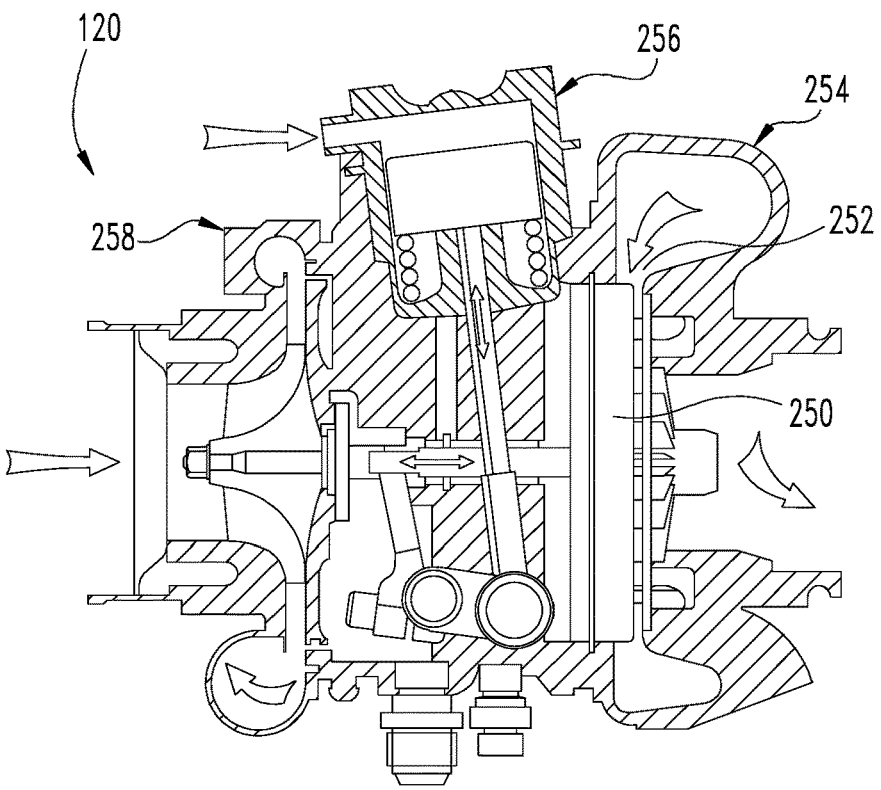

Procedure 200 continues at operation 208 to perform one or more cylinder deactivation operations in response to determining conditional 206 is positive. Operation 208 includes deactivating at least one cylinder 103b, including at least one cylinder pair of cylinders 103b as shown in FIG. 1B. Other embodiments contemplate deactivating two cylinder pairs of cylinders 103b as shown in FIG. 1A. Operation 208 further includes adjusting a geometry of VGT 120. In one embodiment of VGT 120 including a compressor 258 and a turbine 254, such as shown in FIGS. 3A-3B, adjusting the geometry includes adjusting a position of at least one wall 250 of VGT 120 into an exhaust flow path 252 of turbine 254. The wall 250 can be adjusted into and out of the flow path 252 by an actuator 256 that receives a command from controller 140 to adjust the wall position in response to determining the CDA event is triggered or ended. Operation 208 may further include fueling the nominal, active cylinders 103a with increased fueling based on a number of cylinders 103b that are deactivated, engine torque requirements, and/or other operating conditions.

One embodiment of operation 208 includes cutting the fueling to the deactivated cylinder(s) 103b in a stepwise manner. For example, the deactivated cylinder(s) can have a 75% reduction in fuel in the last cycle before the cylinder is deactivated by cutting of the entire fuel flow. In addition, the intake valve, the exhaust valve, or both the intake and the exhaust valve of the deactivated cylinder(s) can be closed in response to the CDA event being triggered. Also, the geometry of the VGT 120 can be adjusted incrementally in a gradual manner, adjusted rapidly, and/or adjusted based on the number of cylinders that are deactivated.

Adjusting the geometry or wall(s) of VGT 120 during the CDA event can allow a higher mass air flow to be maintained, or to minimize the loss in mass air flow. A higher air-fuel ratio can be maintained, or the reduction in the air-fuel ratio can be minimized. In addition, the temperature of the turbine can be controlled by reducing turbine efficiency. The change in VGT geometry during the CDA event optimizes the fueling and emissions of the engine during the CDA event. During the CDA event, additional adjustments to the position of the VGT walls may be applied. For example, the VGT wall(s) may be adjusted to a first position in response to the CDA event being triggered, and then further adjusted during the CDA event to a second position in order to further optimize efficiency and emissions based on current environmental conditions, engine conditions, look-ahead data, and/or vehicle conditions.

Procedure 200 continues at operation 210 to monitor current conditions to adjust the VGT position at operation 212 if necessary, or to determine whether to maintain or end cylinder deactivation at conditional 214. Monitoring current conditions at operation 210 can include monitoring EGT, emissions, fuel consumption, mass air flow (MAF), air-fuel ration (AFR), errors, state changes, load, etc. In response to conditional 214 being negative, procedure 200 returns to operation 210. In response to conditional 214 being positive, procedure 200 continues at operation 216 to exit the CDA event. Reactivation conditions can be based on, for example, exiting a stop-and-go state, increased engine load, change in driving conditions, detected errors during the CDA event, and/or transmission state.

Operation 216 may include one or more of reactivating the deactivated cylinder(s) or cylinder pairs. Operation 216 may also include adjusting the VGT geometry to a normal or nominal state, such as shown in FIG. 3A. Operation 216 may also include decreasing fuel to the active cylinders 103a as the deactivated cylinders 103b are re-activated and based on torque requirements. In one embodiment, the fueling to the deactivated cylinders is gradually increased to nominal to avoid torque spikes. For example, fueling can be provided at 50% of nominal for a first number of cycles, and then 75% of fueling for a second number of cycles, before fueling at 100% of nominal fueling is resumed. The VGT geometry may also be rapidly or gradually adjusted to a nominal state based on the number of reactivated cylinders/cylinder pairs and/or current engine and/or vehicle conditions.

Various aspects of the present disclosure are contemplated as indicated in the claims appended hereto. According one aspect, a system includes an internal combustion engine for propelling a vehicle that include a plurality of cylinders, and each of the cylinders including at least one intake valve and at least one exhaust valve. The system also includes a VGT for receiving an exhaust flow from the plurality of cylinders and a fueling system connected to each of the plurality of cylinders for providing fuel to the plurality of cylinders. A controller is operably connected with the plurality of cylinders, the VGT, and the fueling system. The controller is configured to determine a cylinder deactivation event associated with the at least one cylinder in which the fueling is cut off from the at least one cylinder and at least one of the at least one intake valve and the at least one exhaust valve is closed and, in response to the cylinder deactivation event being present, adjust a geometry of the VGT.

In one embodiment, the geometry of the VGT is adjusted for at least one of the following: maintain or provide a higher mass air flow through the engine; maintain or provide a higher air-fuel ratio in the cylinders; and maintain or provide a higher turbine temperature. In another embodiment, the geometry of the turbine is adjusted by sliding a wall into an exhaust flow path of a turbine of the VGT to reduce an amount of exhaust flow through the exhaust flow path.

In yet another embodiment, the cylinder deactivation event includes at least one pair of the plurality of cylinders being deactivated and a fueling amount to remaining ones of the plurality of cylinders is increased. In a refinement of this embodiment, two pairs of the plurality of cylinders are deactivated.

In yet another embodiment, the controller is configured to adjust the geometry of the VGT during the cylinder deactivation event in response to at least one of: a current environmental condition, a current engine condition, a current vehicle condition, and look-ahead data. In a further embodiment, the controller is configured to, upon initialization of the cylinder deactivation event, cut less than all of the fueling to the at least one cylinder for at least one last cycle before deactivation and the cut all fueling thereafter until cylinder reactivation of the at least one cylinder. In still another embodiment, the controller is configured to, upon initialization of the cylinder deactivation event, provided a stepped reduction in fueling to the one or more cylinders.

In another embodiment, the controller is configured to, upon initialization of the cylinder deactivation event, close one or more of the intake and exhaust valves of the one or more deactivated cylinders. In yet another embodiment, the controller is configured to, upon initialization of the cylinder deactivation event, increase fueling to remaining ones of the plurality of cylinders in response to one or more of deactivation of the one or more cylinders and a torque requirement for the engine. In still another embodiment, the controller is configured to, upon initialization of the cylinder deactivation event, control an adjustment of the geometry of the VGT based on a number of cylinders that are deactivated.

According to another aspect, an apparatus includes a controller operable to control operation of a plurality of cylinders, a VGT, and a fueling system. The controller is configured to determine a cylinder deactivation event associated with the at least one cylinder in which the fueling is cut off from the at least one cylinder and at least one of an intake valve and an exhaust valve of the at least one cylinder is closed. In response to the cylinder deactivation event being present, the controller is configured to adjust a geometry of the VGT.

In another aspect, a method for operating a vehicle includes: determining a cylinder deactivation event associated with operation of an internal combustion engine is present during which at least one cylinder to be deactivated; in response to the cylinder deactivation event being present, determining a number of cylinders of the internal combustion engine for deactivation and deactivating the number of cylinders; and in response to the number of cylinders that are deactivated, adjusting a geometry of a VGT receiving exhaust flow from the engine.

In one embodiment of the method and apparatus, the geometry of the VGT is further adjusted based on current operating conditions. In another embodiment, deactivating the number of cylinders includes cutting fueling to the number of cylinders and increasing a fueling of remaining ones of the cylinders of the internal combustion engine. In a refinement of this embodiment, cutting fueling includes providing a stepped reduction in fueling to the number of cylinders until the fueling is cut.

In yet another embodiment of the method and apparatus, the number of cylinders includes two cylinders and the internal combustion engine includes at least six cylinders. In still another embodiment, the number of cylinders includes four cylinders and the internal combustion engine includes at least six cylinders. In another embodiment, adjusting the geometry of the VGT includes positioning a wall of the VGT in an exhaust flow path through the VGT. In a refinement of this embodiment, the wall of the VGT is re-positioned during the cylinder deactivation event in response to at least one of the following: an environmental condition, an engine condition, a vehicle condition, and look-ahead data.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
an internal combustion engine for propelling a vehicle, the internal combustion engine including a plurality of cylinders, each of the cylinders including at least one intake valve and at least one exhaust valve;
a variable geometry turbine (VGT) for receiving an exhaust flow from the plurality of cylinders;
a fueling system connected to each of the plurality of cylinders for providing fuel to the plurality of cylinders; and
a controller operably connected with the plurality of cylinders, the VGT, and the fueling system, wherein the controller is configured to:
determine a cylinder deactivation event associated with the at least one cylinder in which the fueling is cut off from the at least one cylinder and at least one of the at least one intake valve and the at least one exhaust valve is closed; and
in response to the cylinder deactivation event being present, adjust a geometry of the VGT.

2. The system of claim 1, wherein the geometry of the VGT is adjusted for at least one of the following: maintain or provide a higher mass air flow through the engine; maintain or provide a higher air-fuel ratio in the cylinders; and maintain or provide a higher turbine output temperature.

3. The system of claim 1, wherein the geometry of the turbine is adjusted by sliding a wall into an exhaust flow path of a turbine of the VGT to reduce an amount of exhaust flow through the exhaust flow path.

4. The system of claim 1, wherein the cylinder deactivation event includes at least one pair of the plurality of cylinders being deactivated and a fueling amount to remaining ones of the plurality of cylinders is increased.

5. The system of claim 4, wherein two pairs of the plurality of cylinders are deactivated.

6. The system of claim 1, wherein the controller is configured to adjust the geometry of the VGT during the cylinder deactivation event in response to at least one of: a current environmental condition, a current engine condition, a current vehicle condition, and look-ahead data.

7. The system of claim 1, wherein the controller is configured to, upon initialization of the cylinder deactivation event, cut less than all of the fueling to the at least one cylinder for at least one last cycle before deactivation and then the cut all fueling thereafter until cylinder reactivation of the at least one cylinder.

8. The system of claim 1, wherein the controller is configured to, upon initialization of the cylinder deactivation event, provided a stepped reduction in fueling to the at least one cylinder.

9. The system of claim 1, wherein the controller is configured to, upon initialization of the cylinder deactivation event, close one or more of the intake and exhaust valves of the at least one cylinder.

10. The system of claim 1, wherein the controller is configured to, upon initialization of the cylinder deactivation event, increase fueling to remaining ones of the plurality of cylinders in response to one or more of deactivation of the at least one cylinder and a torque requirement for the engine.

11. The system of claim 1, wherein the controller is configured to, upon initialization of the cylinder deactivation event, control an adjustment of the geometry of the VGT based on a number of cylinders that are deactivated.

12. A method for operating a vehicle, comprising:
determining a cylinder deactivation event associated with operation of an internal combustion engine is present during which at least one cylinder to be deactivated;
in response to the cylinder deactivation event being present, determining a number of cylinders of the internal combustion engine for deactivation and deactivating the number of cylinders; and
in response to the number of cylinders that are deactivated, adjusting a geometry of a variable geometry turbine (VGT) receiving exhaust flow from the engine.

13. The method of claim 12, wherein the geometry of the VGT is further adjusted based on current operating conditions.

14. The method of claim 12, wherein deactivating the number of cylinders includes cutting fueling to the number of cylinders and increasing a fueling of remaining ones of the cylinders of the internal combustion engine.

15. The method of claim 14, wherein cutting fueling includes providing a stepped reduction in fueling to the number of cylinders until the fueling is cut.

16. The method of claim 12, wherein the number of cylinders includes two cylinders and the internal combustion engine includes at least six cylinders.

17. The method of claim 12, wherein the number of cylinders includes four cylinders and the internal combustion engine includes at least six cylinders.

18. The method of claim 12, wherein adjusting the geometry of the VGT includes positioning a wall of the VGT in an exhaust flow path through the VGT.

19. The method of claim 18, further comprising re-positioning the wall of the VGT during the cylinder deactivation event in response to at least one of the following: an environmental condition, an engine condition, a vehicle condition, and look-ahead data.

20. An apparatus, comprising:
a controller operable to control operation of a plurality of cylinders, a variable geometry turbine (VGT), and a fueling system, wherein the controller is configured to:

determine a cylinder deactivation event associated with at least one cylinder in which the fueling is cut off from the at least one cylinder and at least one of an intake valve and an exhaust valve of the at least one cylinder is closed; and in response to the cylinder deactivation event being present, adjust a geometry of the VGT.

\* \* \* \* \*